United States Patent
Hung et al.

(10) Patent No.: US 7,433,006 B2
(45) Date of Patent: Oct. 7, 2008

(54) LIQUID CRYSTAL DISPLAY WITH LOW CONSUMPTION STORAGE CAPACITORS

(75) Inventors: Chao Yi Hung, Miao-Li (TW); Hung Yu Chen, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 263 days.

(21) Appl. No.: 11/288,747

(22) Filed: Nov. 28, 2005

(65) Prior Publication Data
US 2006/0114400 A1 Jun. 1, 2006

(30) Foreign Application Priority Data
Nov. 26, 2004 (TW) .............. 93136466 A

(51) Int. Cl.
*G02F 1/1343* (2006.01)
(52) U.S. Cl. ................................... 349/141
(58) Field of Classification Search .......... 349/141
See application file for complete search history.

(56) References Cited
U.S. PATENT DOCUMENTS

| | | | |
|---|---|---|---|
| 6,661,492 B2 * | 12/2003 | Kim .......................... 349/141 |
| 6,738,110 B2 * | 5/2004 | Lee ............................. 349/46 |
| 6,744,482 B2 * | 6/2004 | Matsumoto et al. ......... 349/141 |
| 6,803,974 B2 * | 10/2004 | Kamoshida et al. ........... 349/42 |
| 6,862,067 B2 * | 3/2005 | Matsumoto et al. ......... 349/141 |
| 6,927,808 B2 * | 8/2005 | Ono et al. ..................... 349/43 |
| 6,943,861 B2 * | 9/2005 | Tomioka et al. ............. 349/141 |
| 6,947,115 B2 * | 9/2005 | Kurahashi et al. ........... 349/138 |
| 6,950,167 B2 * | 9/2005 | Matsumoto et al. ......... 349/141 |
| 6,970,223 B2 * | 11/2005 | Lee et al. ..................... 349/141 |

FOREIGN PATENT DOCUMENTS

TW    493101    7/2002

* cited by examiner

*Primary Examiner*—James A Dudek
(74) *Attorney, Agent, or Firm*—Wei Te Chung

(57) ABSTRACT

An LCD includes an insulating substrate (30) with gate lines (32) and data lines (31) disposed thereon. The gate lines are parallel to each other and extend along a first direction, and the data lines are parallel to each other and extend along a second direction. The data lines cross the gate lines thereby defining a multiplicity of pixel regions (3). Each of the pixel regions includes a TFT (35), a pixel electrode (33) connected to the TFT, a common electrode (36) connected to a corresponding one of the data lines, and a dielectric layer (37) disposed between the common and pixel electrodes. The common electrode includes a plurality of protrusions (34). The protrusions, the dielectric layer, and the pixel electrode cooperatively define a storage capacitor (50) for holding the pixel region at a set voltage level until the next refresh cycle when the TFT is turned off.

10 Claims, 3 Drawing Sheets

LIQUID CRYSTAL DISPLAY WITH LOW CONSUMPTION STORAGE CAPACITORS

FIELD OF THE INVENTION

The present invention relates to liquid crystal displays (LCDs), and more particularly to a TFT (thin film transistor) substrate of an LCD with a low consumption storage capacitor.

BACKGROUND

LCDs are generally categorized by their driving modes into active matrix LCDs and passive matrix LCDs. Compared with passive matrix LCDs, active matrix LCDs generally have faster response speeds, better color displays, and higher contrast ratios. For these reasons, active matrix LCDs are more popular than passive matrix LCDs.

Active matrix LCDs are usually categorized, according to the manner in which they transport light, into reflective mode, transmissive mode, and transflective mode active matrix LCDs. Though reflective mode, transmissive mode, and transflective mode active matrix LCDs adopt different modes of transporting light, they all use thin film transistors (TFTs) to achieve an active display.

In general, a TFT LCD includes a TFT substrate. A typical TFT substrate mainly includes a plurality of gate lines arranged in parallel and extending along a first direction, and a plurality of data lines arranged in parallel and extending along a second direction perpendicular to that of the gate lines. Thus, the gate lines and data lines define a multiplicity of pixel regions arranged in an array.

FIG. 4 is a schematic, top cross-sectional view of a configuration of components of a pixel region of a typical TFT substrate. FIG. 5 is a schematic, side cross-sectional view corresponding to part of line V-V of FIG. 4. A pixel region 1 of a TFT substrate 10 is defined by two parallel gate lines 12, and a data line 11 perpendicularly crossing the data lines 12. The pixel region 1 includes a pixel electrode 13, a TFT 16, and a plurality of storage electrode elements 14 therein. The storage electrode elements 14 extend from the gate line 12, are stripe-shaped, and are parallel to each other. The storage electrode elements 14 cooperatively form a lower storage electrode. The pixel electrode 13 partially overlaps the storage electrode elements 14. Regions of the pixel electrode 13 that overlap the storage electrode elements 14 are cooperatively used as an upper storage electrode. The upper and lower storage electrodes and an intervening dielectric layer 17 cooperatively form a storage capacitor.

In operation, column data drivers (not shown) simultaneously apply the required voltages to every pixel in a row as selected by a row scan driver (not shown). The scan driver turns the TFTs 16 on, to charge the storage capacitors of every pixel region 1 in that row. Once each TFT 16 is turned off, the storage capacitor holds the pixel region 1 at the set voltage level until the next refresh cycle.

However, the storage electrode elements 14 extend from and electrically connect to the gate line 12, which increases the load of the gate line 12 when it is being used to hold the pixel region 1 at the set voltage level. This means that the LCD employing the TFT substrate 10 has high power consumption.

What is needed, therefore, is an LCD having a TFT substrate with a low consumption storage capacitor.

SUMMARY

In a preferred embodiment, an LCD includes a substrate, and a plurality of gate lines and data lines disposed on the substrate. The gate lines are parallel to each other and extend along a first direction, and the data lines are parallel to each other and extend along a second direction. The gate lines cross the data lines and thus define a multiplicity of pixel regions. Each of the pixel regions includes a TFT, a pixel electrode connected to the TFT, a common electrode connected to a corresponding one of the data lines, and a dielectric layer disposed between the common and pixel electrodes. The common electrode includes a plurality of protrusions. The protrusions, the dielectric layer, and the pixel electrode cooperatively define a storage capacitor for holding the pixel region at a set voltage level until the next refresh cycle when the TFT is turned off.

The storage capacitor uses the protrusions of the common electrode as a lower storage electrode. The common electrode provides a reference voltage to the lower storage electrode, which voltage is less than the voltage control signal used in a typical TFT substrate. That is, the storage capacitor does not increase the load of the gate lines or other driving electrodes. Thus, the storage capacitor has lower power consumption than that of a conventional TFT LCD.

Other advantages and novel features will become more apparent from the following detailed description when taken in conjunction with the accompanying drawings.

DETAILED DESCRIPTION OF PREFERRED EMBODIMENTS

Figure 1:
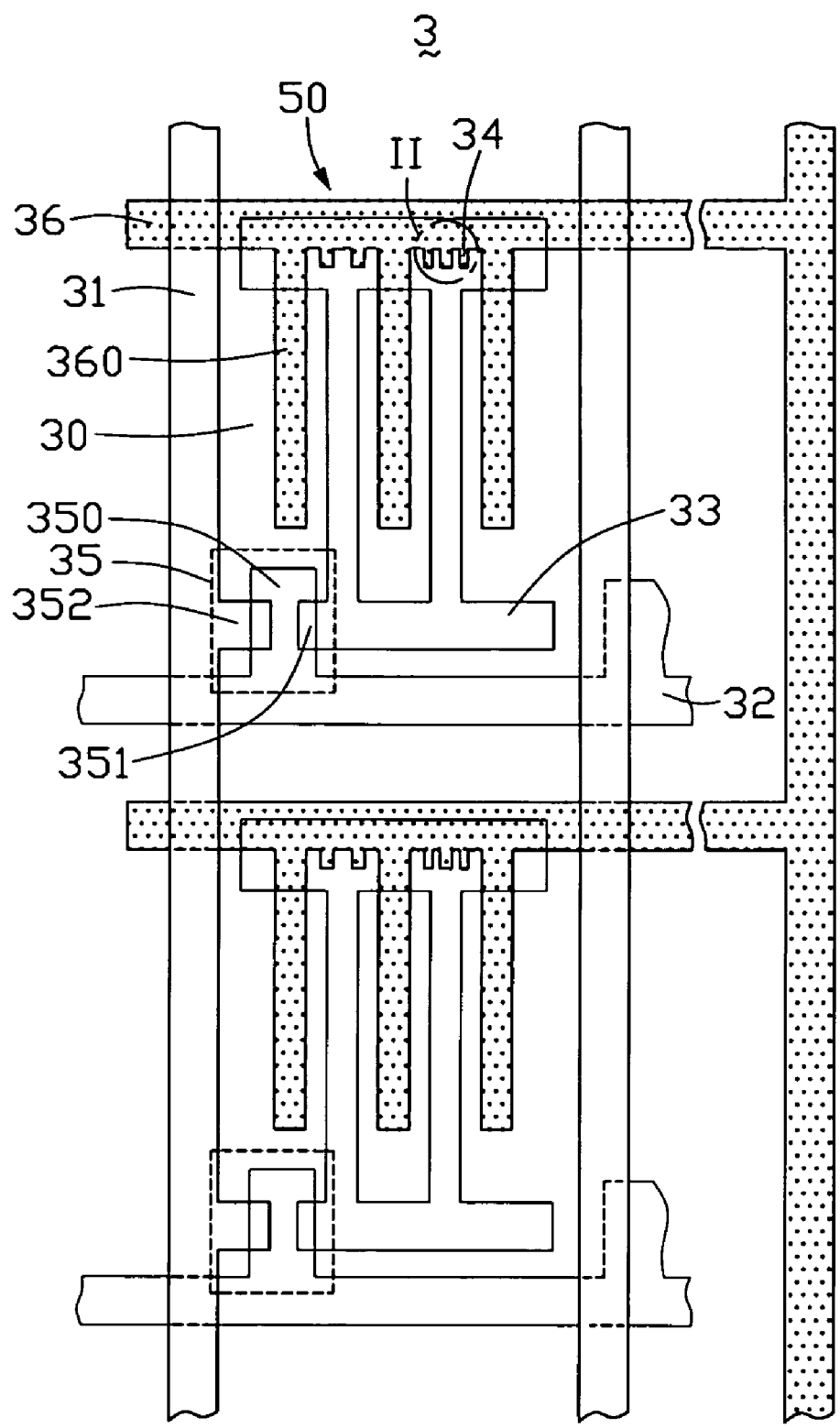
FIG. 1 is a schematic, abbreviated, top cross-sectional view of components on part of a TFT substrate of an LCD according to a preferred embodiment of the present invention, showing a configuration of electrodes.
Figure 2:
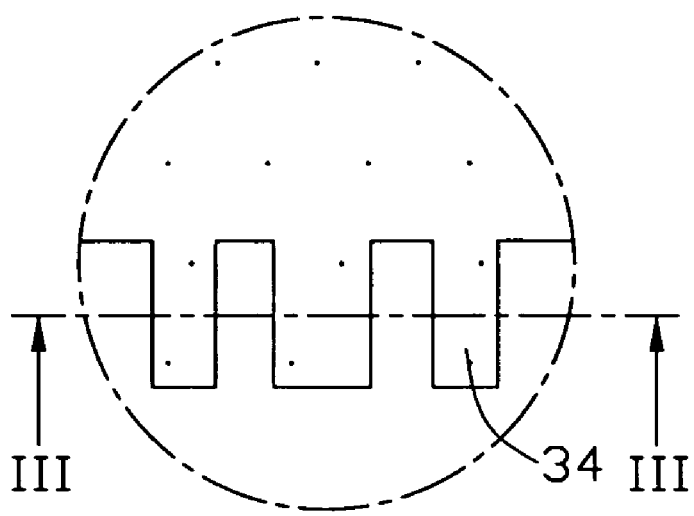
FIG. 2 is an enlarged view of a circled portion II of FIG. 1.
Figure 3:
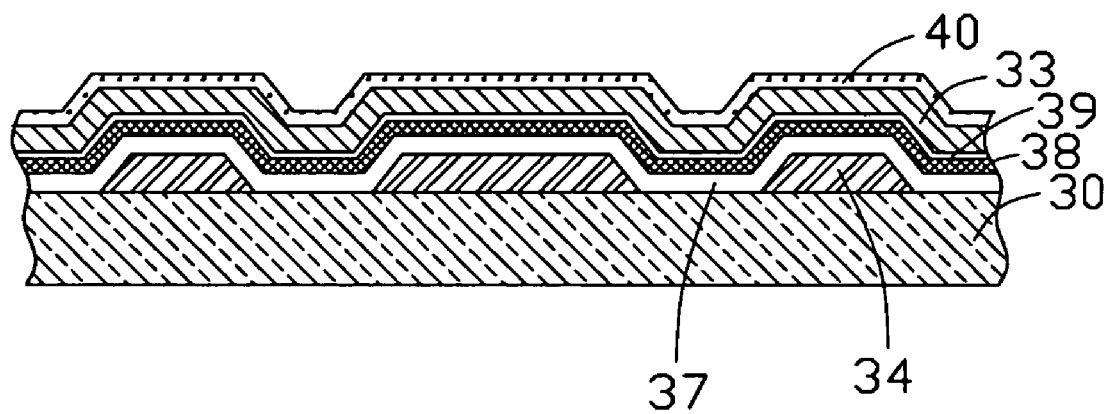
FIG. 3 is a schematic, side cross-sectional view corresponding to line III-III of FIG. 2.
Figure 4:
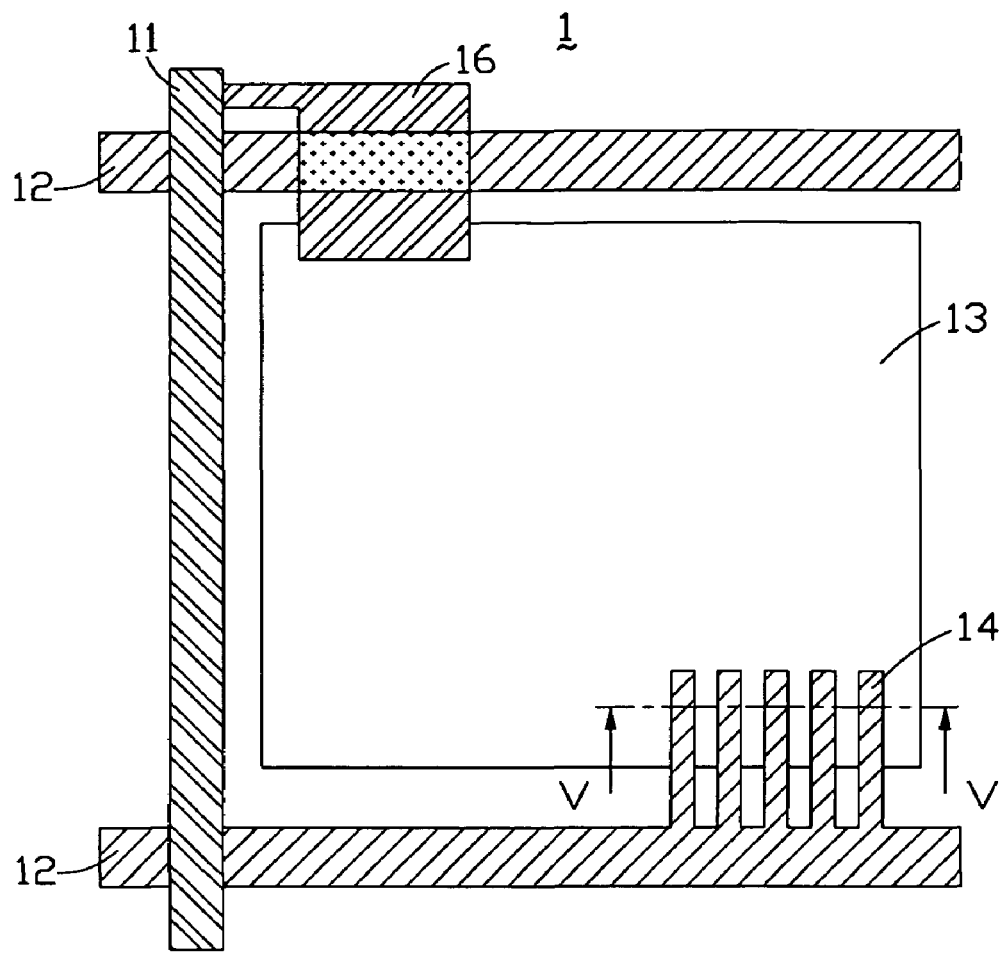
FIG. 4 is a schematic, top cross-sectional view of a configuration of components of a pixel region of a typical TFT substrate.
Figure 5:
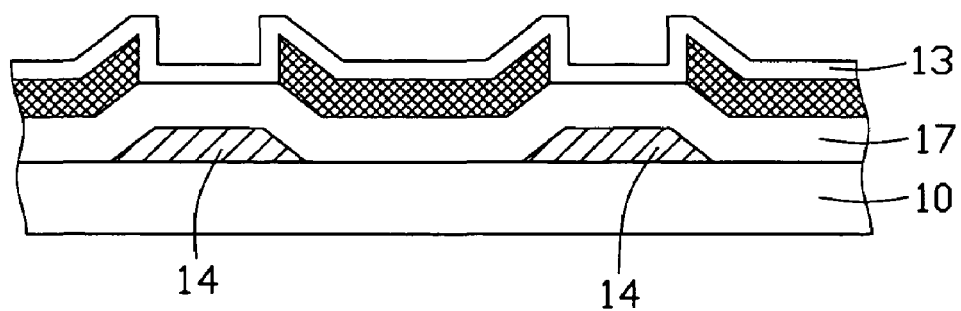
FIG. 5 is a schematic, side cross-sectional view corresponding to part of line V-V of FIG. 4.

FIG. 1 is a schematic, abbreviated, top cross-sectional view of components on part of a TFT substrate of an LCD according to a preferred embodiment of the present invention. FIG. 2 is an enlarged view of a circled portion II of FIG. 1. FIG. 3 is a schematic, side cross-sectional view corresponding to line III-III of FIG. 2.

Referring to FIGS. 1-3, a plurality of data lines 31 and gate lines 32 are formed on the TFT substrate 30. The data lines 31 are arranged parallel to each other, and extend along a longitudinal direction. The gate lines 32 are arranged parallel to each other, and extend along a direction transverse to the data lines 31. Thus, the data and gate lines 31, 32 cooperatively define a multiplicity of pixel regions 3.

Each of the pixel regions 3 includes a thin film transistor (TFT) 35, a common electrode 36, and a pixel electrode 33. The TFT 35 includes a gate electrode 350 connected to the gate line 32 for receiving voltage control signals therefrom, a source electrode 352 connected to the data line 31 for receiving display signals therefrom, and a drain electrode 351 connected to the pixel electrode 33 for providing display signals thereto. When a voltage control signal is provided to the gate electrode 350 via the gate line 32 to turn on the TFT 35, the display signals are provided to the pixel electrode 33 from the data line 31, via the source and drain electrodes 352, 351.

The common electrode 36 includes a plurality of stripe-shaped portions 360 and a plurality of protrusions 34. The stripe-shaped portions 360 and protrusions 34 extend from a main body of the common electrode 36, and are parallel to each other. The main body of the common electrode 36 provides a reference voltage signal to the stripe-shaped portions 360 and the protrusions 34. Each of the protrusions 34 has a generally rectangular shape. Alternatively, shapes of the protrusions 34 may be cylindrical, generally triangular, generally hemispherical, or cuboidal.

The pixel electrode 33 partially overlaps the main body of the common electrode 36 and the stripe-shaped portions 360, and completely overlaps the protrusions 34.

Referring particularly to FIG. 3, a dielectric layer 37, a resistor layer 38, and an insulative layer 39 are disposed between the pixel electrode 33 and the common electrode 36, in that order from bottom to top. That is, the dielectric layer 37, resistor layer 38, and insulative layer 39 all cover the protrusions 34. The pixel electrode 33 may be made from indium tin oxide (ITO), indium zinc oxide (IZO), or another transparent conductive material. The dielectric layer 37 may be made from benzocyclobutene, acryl, or another dielectric material. An alignment layer 40 covers the pixel electrode 33.

The portions of the pixel electrode 33 that overlap the main body of the common electrode 36 and the protrusions 34 form an upper storage electrode, and the overlapped portions of the main body of the common electrode 36 and the protrusions 34 cooperatively form a lower storage electrode. The upper and lower storage electrodes and the dielectric layer 37 cooperatively form a storage capacitor 50 for holding the pixel region 3 at a set voltage level until the next refresh cycle when the TFT 35 is turned off.

With this configuration, the protrusions 34 are cooperatively used as the single lower storage electrode, each of the protrusions 34 cooperating with the pixel electrode 33 and the dielectric layer 37 to form a sub-capacitor. The sub-capacitors are connected in parallel via the main body of the common electrode 36 to form the single storage capacitor 50. To increase the capacity of the storage capacitor 50, holes (not shown) may be formed in the overlapped portions of the main body of the common electrode 36, the protrusions 34, and corresponding portions of the pixel electrode 33.

The storage capacitor 50 utilizes the protrusions 34 of the common electrode 36 as forming part of the lower storage electrode, and the main body of the common electrode 36 provides a reference voltage to the lower storage electrode, which reference voltage is less than the voltage control signal used in the conventional TFT substrate 10 described above. That is, the storage capacitor 50 does not increase the load of the gate lines 32 or other driving electrodes. Thus, the storage capacitor 50 has lower power consumption.

It is to be understood, however, that even though numerous characteristics and advantages of preferred embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display, comprising:
an insulating substrate;
a plurality of gate lines disposed at the insulating substrate, the gate lines arranged parallel to each other and each extending along a first direction; and
a plurality of data lines disposed at the insulating substrate, the data lines arranged parallel to each other and each extending along a second direction, wherein the data lines cross the gate lines to define a plurality of pixel regions;
wherein each of the pixel regions comprises a thin film transistor, a pixel electrode connected to the thin film transistor, a common electrode having a plurality of stripe-shaped portions and a main body, and a dielectric layer disposed between the common and pixel electrodes; and
the stripe-shaped portions extend from the main body of the common electrode, and the main body of the common electrode comprises a plurality of protrusions, and the pixel electrode partially overlaps the common electrode but completely overlaps the protrusions of the common electrode such that the protrusions, the dielectric layer, and the pixel electrode cooperatively define a storage capacitor.

2. The liquid crystal display as claimed in claim 1, wherein the protrusions define a plurality of holes therein.

3. The liquid crystal display as claimed in claim 2, wherein portions of the pixel electrode that overlap the protrusions define a plurality of holes therein.

4. The liquid crystal display as claimed in claim 3, wherein one or mare shapes of the protrusions are selected from the group consisting of generally rectangular, cylindrical, generally triangular, generally hemispherical, and cuboidal.

5. The liquid crystal display as claimed in claim 1, wherein the pixel electrode comprises indium tin oxide.

6. The liquid crystal display as claimed in claim 1, wherein the pixel electrode comprises indium zinc oxide.

7. The liquid crystal display as claimed in claim 1, wherein the dielectric layer comprises benzocyclobutene.

8. The liquid crystal display as claimed in claim 1, wherein the dielectric layer comprises acryl.

9. The liquid crystal display as claimed in claim 1, wherein the protrusions extend from the main body of the common electrode along a direction parallel to the stripe-shaped portions.

10. The liquid crystal display as claimed in claim 1, wherein protrusions of the common electrode are arranged in a plurality of groups, each group comprising a plurality of parallel protrusions, and each group arranged between two respective adjacent stripe-shaped portions of the common electrode.

* * * * *